United States Patent
Corfitsen

(10) Patent No.: US 9,227,601 B2
(45) Date of Patent: Jan. 5, 2016

(54) METHOD FOR EXCHANGING BATTERIES IN BATTERY-POWERED VEHICLES

(76) Inventor: Sten Corfitsen, Stockholm (SE)

( * ) Notice: Subject to any disclaimer, the term of this patent is extended or adjusted under 35 U.S.C. 154(b) by 279 days.

(21) Appl. No.: 13/805,399

(22) PCT Filed: Jun. 17, 2011

(86) PCT No.: PCT/SE2011/050774
§ 371 (c)(1),
(2), (4) Date: Jan. 16, 2013

(87) PCT Pub. No.: WO2011/162685
PCT Pub. Date: Dec. 29, 2011

(65) Prior Publication Data
US 2013/0104361 A1    May 2, 2013

(30) Foreign Application Priority Data
Jun. 21, 2010 (SE) ........................ 1050656

(51) Int. Cl.
*B60S 5/06* (2006.01)
*B60L 11/18* (2006.01)

(52) U.S. Cl.
CPC ............... *B60S 5/06* (2013.01); *B60L 11/1822* (2013.01); *B60L 11/1877* (2013.01); *Y02T 10/7005* (2013.01); *Y02T 10/705* (2013.01); *Y02T 10/7072* (2013.01); *Y02T 90/124* (2013.01); *Y02T 90/14* (2013.01); *Y10T 29/4973* (2015.01)

(58) Field of Classification Search
CPC ... B60S 5/06; B60L 11/1822; B60L 11/1877; B60L 11/18; B23P 6/00; H01M 2/1083; B60K 2001/0455; B60K 2001/0461; B60K 2001/0488; B60K 2001/0494; Y10T 29/4973; Y02T 10/705; Y02T 10/7072; Y02T 10/7005; Y02T 90/14; Y02T 90/124
See application file for complete search history.

(56) References Cited

U.S. PATENT DOCUMENTS

| 5,187,423 A | 2/1993 | Marton |
| 7,712,563 B2 * | 5/2010 | Niebuhr ........................ 180/68.5 |
| 2010/0292877 A1 * | 11/2010 | Lee ................................. 701/21 |

FOREIGN PATENT DOCUMENTS

| DE | 10333594 A1 * | 2/2005 | ............... B60K 1/04 |
| FR | 2685547 | 6/1993 | |
| FR | 2737694 | 2/1997 | |
| WO | 2005/035288 | 4/2005 | |

OTHER PUBLICATIONS

International Search Report dated Sep. 29, 2011, corresponding to PCT/SE2011/050774.

* cited by examiner

*Primary Examiner* — Sarang Afzali
(74) *Attorney, Agent, or Firm* — Young & Thompson

(57) ABSTRACT

The vehicle includes a horizontally placed compartment for one or several batteries lying parallel to each other, a robot includes a transport plane that can be extended and withdrawn in one direction, and displaced along two mutually perpendicular directions relative to the one direction. The vehicle takes up a predetermined location relative to the robot close to the cover, the robot determines via an optical element the position of the battery in the compartment, and displaces the transport plane to a predetermined position relative to the battery. A withdrawal member attaches to the battery and withdraws it from the compartment to the transport plane. The robot transports the battery to a charging station, and transports a charged battery from a store of charged batteries to the transport plane. A displacement element inserts the battery at a predetermined position into the compartment, and the cover is closed.

18 Claims, 3 Drawing Sheets

# METHOD FOR EXCHANGING BATTERIES IN BATTERY-POWERED VEHICLES

BACKGROUND OF THE INVENTION

1. Field of the Invention

The present invention relates to a method for exchanging batteries in battery-powered vehicles.

2. Description of the Related Art

A system for the exchange of electrical batteries for cars is already known. The system operates from beneath and it involves, after the car has been driven up onto a ramp, similar to those that are available for lubrication pits, an arrangement coming forward, lifting down the battery from underneath the car and replacing it with a fully charged battery that is brought to the car from underneath and upwards. This solution requires that the battery-exchange arrangement be installed in an excavated pit, which is a considerable disadvantage. In addition, the environment underneath a vehicle is not suitable for managing the exchange of batteries, since the lower surface of a car is exposed to dirt and the battery may be damaged when a vehicle drives over an object in a carriage-way.

There are thus several disadvantages with the described prior-art system.

BRIEF SUMMARY OF THE INVENTION

The present invention eliminates these disadvantages.

The present invention thus relates to a method for exchanging batteries in battery-powered vehicles, comprising a robot for the transport of a battery to and from the vehicle respectively, and it is characterised in that the vehicle is provided with a horizontally placed compartment for one or several batteries lying parallel to each other, in that the compartment is provided with a cover that can be opened, in that the robot is provided with a transport plane that can be extended and withdrawn in one direction, in that the transport plane can be displaced also along two mutually perpendicular directions relative to the said direction, in that the vehicle is caused to take up a predetermined location relative to the robot, where the said transport plane is located at the said cover of the vehicle, in that the cover is caused to be opened, in that the robot is caused to determine by means of an optical means the position of the battery, in that the robot is caused to displace the said transport plane to a predetermined position relative to the battery at which position the transport plane is extended, in that a withdrawal means that belongs to the robot is caused to be attached to the battery in the said compartment and that is to be exchanged, in that the battery is withdrawn from the said compartment by means of the said withdrawal means such that it rests on the transport plane, in that the robot is caused to transport the battery by means of the transport plane and subsequent transporters to a charging station, in that the robot is caused to transport by means of transporters a charged battery from a store of charged batteries in the robot to the said transport plane, in that a displacement means that belongs to the robot is caused to insert at a predetermined position the battery into the said compartment, and in that the cover is caused to be closed.

BRIEF DESCRIPTION OF THE DRAWINGS

The invention will be described in more detail below, partly in association with an embodiment of the invention shown in the attached drawings, where.

DETAILED DESCRIPTION OF THE PREFERRED EMBODIMENTS

Figure 1:
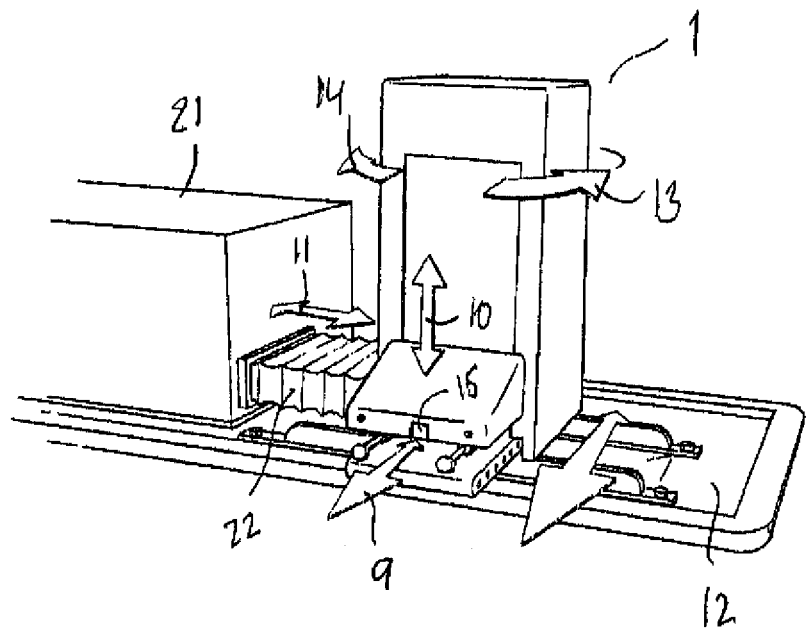
FIG. 1 shows an overview in perspective of an arrangement in which the invention is applied.
Figure 4:
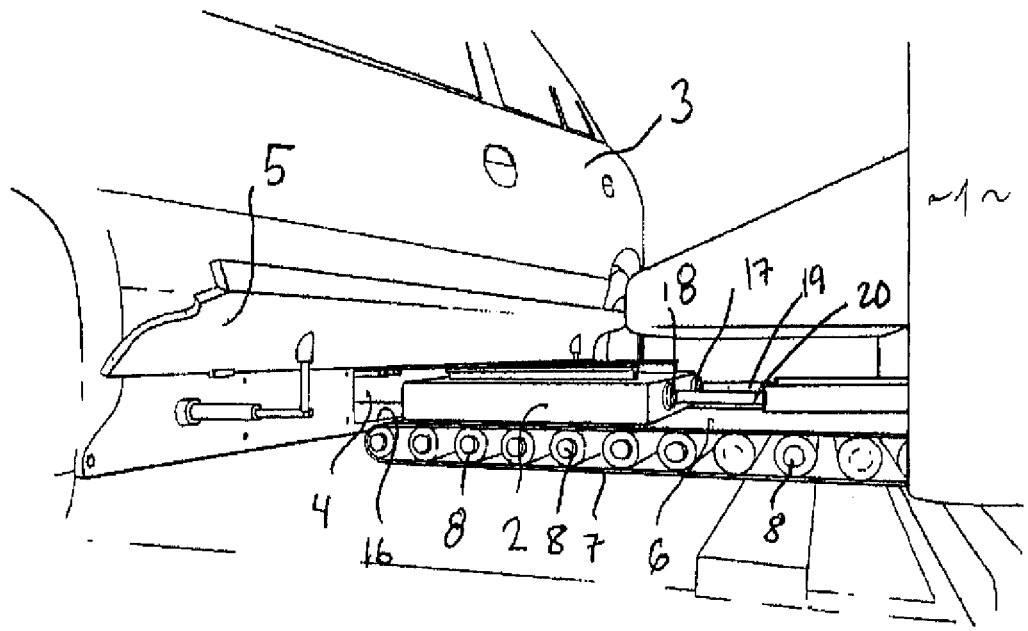
FIG. 4 shows a part of an arrangement for the exchange of batteries and a part of a vehicle.

The present method for exchanging batteries in battery-powered vehicles by means of a robot 1 for the transport of a battery 2 to and from the vehicle 3 respectively is shown in FIGS. 1 and 4.

According to the invention, the vehicle 3 is provided with a horizontally placed compartment 4 for one or several batteries 2 lying parallel to each other. The compartment 4 is located in the lower part of the vehicle and between the wheel axles of the vehicle. The compartment 4 is provided with a cover 5 that can be opened. The robot 1 is provided with a transport plane 6 that can be extended and withdrawn in one direction 9. It is preferable that the transport plane be of the type in which an endless belt 7 is driven by rollers 8 within the belt, as is illustrated in FIG. 4. Alternatively, the transport plane may be constituted by a roller conveyor.

The transport plane 6 can be displaced also along two mutually perpendicular directions 10, 11 relative to the said direction 9, as is illustrated in FIG. 1. It may be possible to displace the transport plane in itself, or it may be possible to displace it in that it is possible to displace the robot 1 relative to its support 12. It is preferable that the robot can also be rotated around its own axis as is illustrated by the arrows 13, 14 in FIG. 1 in order to compensate, if necessary, the vehicle 3 standing obliquely relative to the robot 1.

According to the method, the vehicle 3 is caused to take a predetermined position relative to the robot 1, where the said transport plane 6 is located at the said cover 5 of the vehicle 3. The cover 5 is subsequently caused to be opened, which may take place by means of an operating arrangement inside the vehicle or manually.

The robot is thereafter caused to determine the position of the battery 2 in the said compartment 4 by means of an optical means.

According to one preferred embodiment, the said optical means is a scanning laser 15 mounted on the robot and directed away from the robot 1.

Alternatively, the said optical means 15 may be a video camera with its associated image processing software.

When the position of the battery in the compartment has been determined, the robot 1 is caused to displace the said transport plane 6 to a predetermined position relative to the battery, at which position the transport plane is extended. This predetermined position is close to the vehicle, and the upper surface of the transport plane is there at the same height as the lower surface 16 of the said compartment 4, as is illustrated in FIG. 4.

A gripper that belongs to the robot is caused to be attached to the battery in the said compartment 4 and that is to be exchanged.

The said gripper comprises, according to one preferred embodiment, suction cups 17, 18 mounted onto drawbars 19, 20, which suction cups are caused to attach by suction to the surface of the battery that faces the robot. The suction cups are connected in a known manner to a vacuum pump. The gripper can be designed in some other suitable manner, using, for example, hooks or claws that are attached to the battery.

The battery 2 is thereafter drawn from the said compartment 4 by means of the said gripper such that it rests on the transport plane 6.

The robot 1 is caused to transport the battery by means of the transport plane 6 and subsequent transporters to a charging station 21. Subsequent transporters are located inside a bellows 22 between the robot 1 and the charging station 21. The charging station 21 comprises also a store of charged batteries. The robot 1 is caused to transport by means of the said transporters a charged battery from a store of charged batteries to the said transport plane 6. This situation is illustrated in FIG. 4.

A displacement means that belongs to the robot is subsequently caused to insert at a predetermined position the battery 2 into the said compartment 4, after which the cover 5 is caused to be closed.

According to one preferred embodiment, the robot 1 is caused to identify by means of a detection device the battery or batteries before removal. It is in this way ensured that a battery that is suitable for the vehicle is inserted into the vehicle.

It is furthermore preferred that the detection device be a scanning laser. Alternatively, the detection device may be a video camera 15 with its associated image processing software.

In this way, the previously mentioned scanning laser can be used for the detection. Identification of the battery can be accomplished through the scanning of a barcode attached to the surface of the battery that faces the robot.

Alternatively, an RFID-transponder (Radio Frequency Identification) may be attached to the battery, which transponder is read by a transmitter-receiver arrangement in the robot.

According to one preferred embodiment, the above-mentioned displacement means may comprise drawbars that are extended from the robot 1 in order in this way to insert the battery into the said compartment. It is appropriate that the previously described drawbars 19, 20 be used in order to insert the battery into the said compartment 4.

According to a further preferred embodiment, the battery, or each one of the batteries, has or have protrusions 23-26 or wheels that are caused to interact with guiderails 27, 28 located transversely across the longitudinal direction of the vehicle in the said compartment 4 in order to position the battery in the said compartment. The protrusions may have any suitable form at all, as may also the guiderails. The guiderails may be so arranged that the battery is suspended from these in the compartment 4. The battery may be provided on the lower side also with wheels (not shown in the drawings), which are arranged to roll on the bottom on the compartment 4 during the interaction between the protrusions and the guiderails.

It is preferred that the said optical means 15 be caused to determine the position of the said guiderails 27, 28 and the position of the said protrusions 23-26 or wheels, such that the robot can adjust the position of the transport plane 6 correctly.

Figure 2:
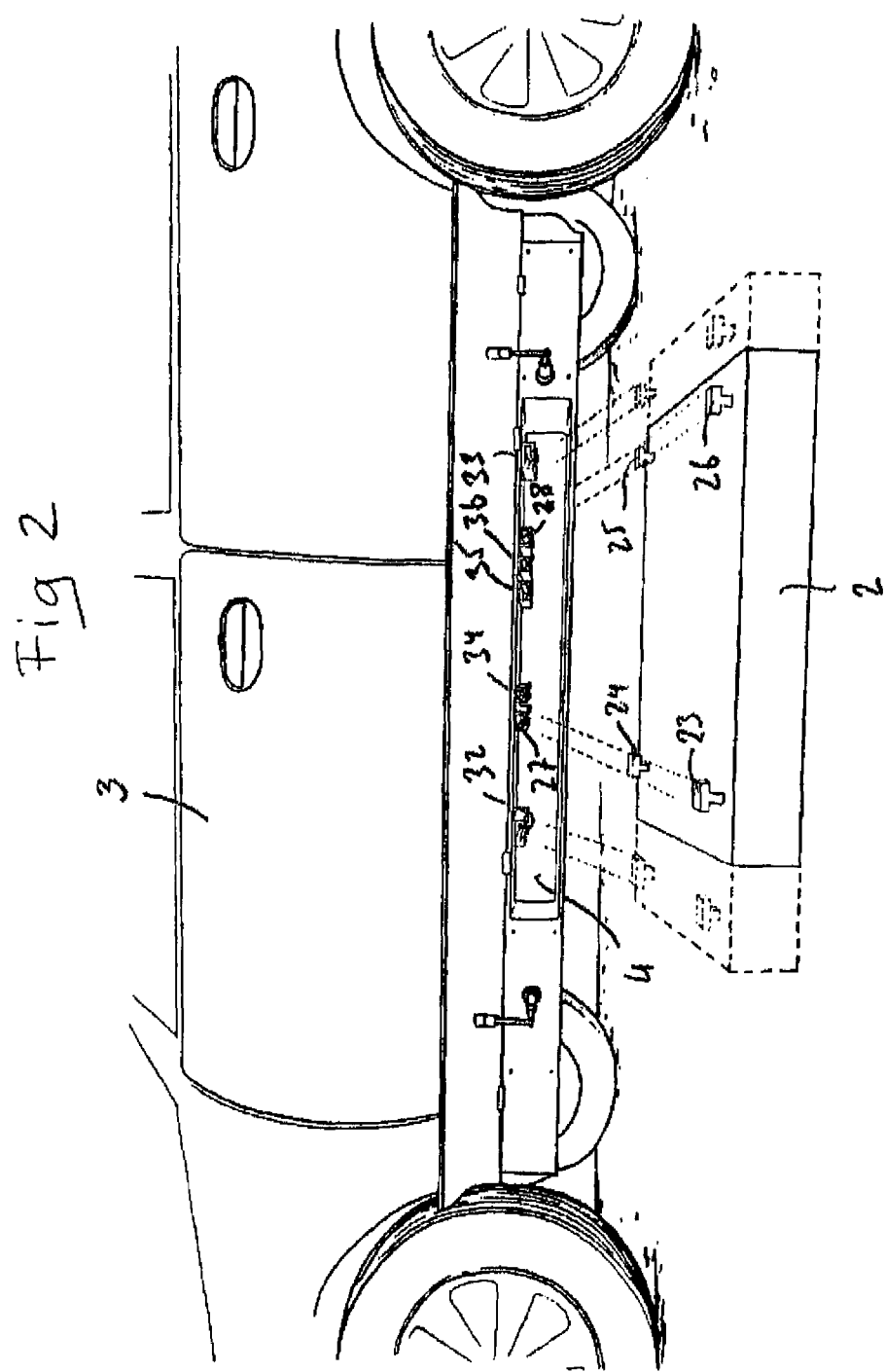
FIGS. 2 and 3 show parts of a vehicle and a battery in order to illustrate the invention.
Figure 3:
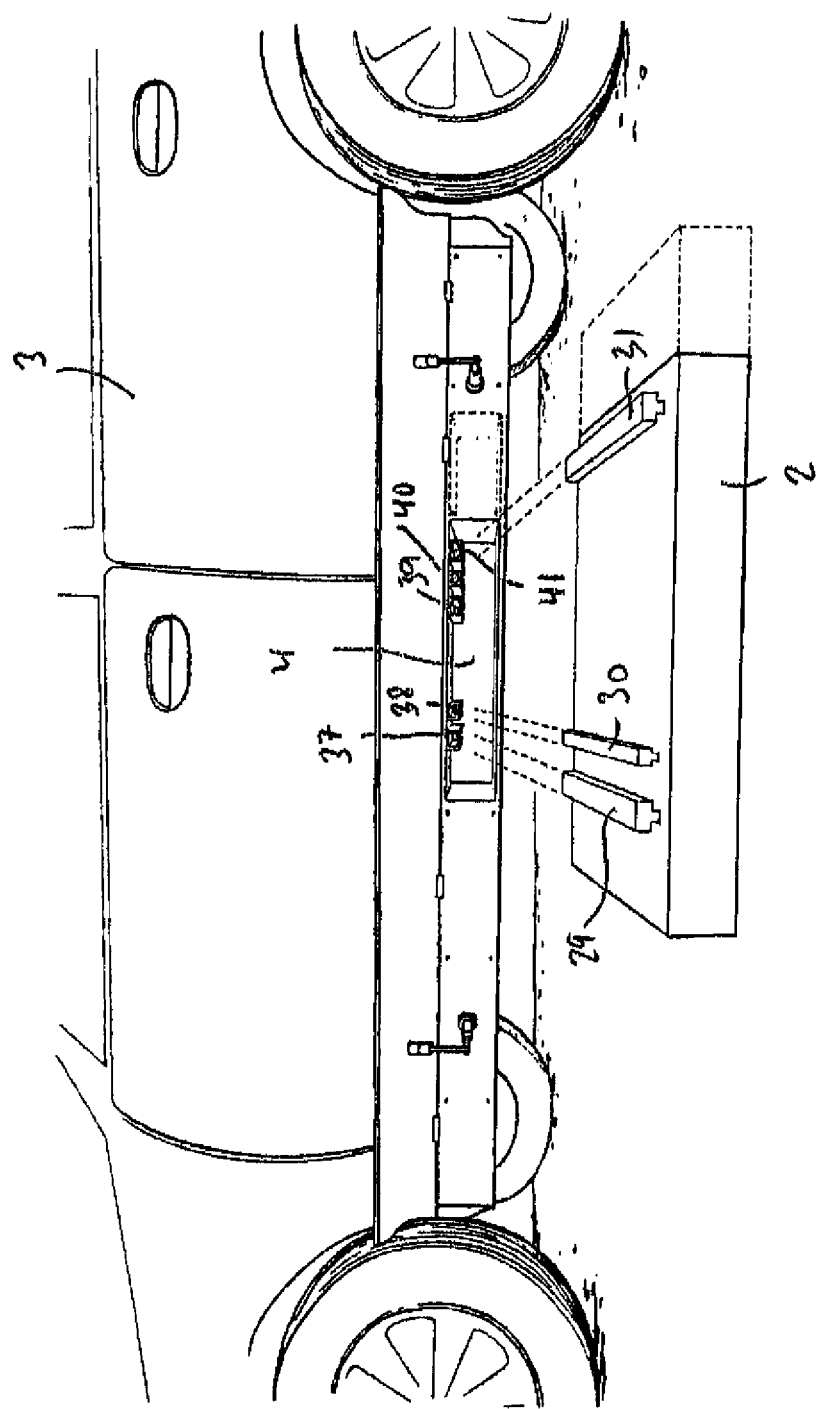

The protrusions may extend the complete length of the battery 2, as is illustrated in FIG. 3. There may be several protrusions 32-41 with different locations, as is shown in FIGS. 2 and 3. The purpose is that it should be possible to insert different batteries into the compartment, depending on the supply of batteries in the store of charged batteries in the robot. Through the robot determining the identity of a battery that is to be removed from the compartment, it is possible for the robot to retrieve information from a database of vehicles and battery properties concerning which battery or batteries it would be possible to insert into the compartment 4 of a particular vehicle. This gives large flexibility.

The arrangement described above can be placed completely above ground level, and no excavation is necessary.

Furthermore, according to the invention, the batteries are located well-protected in a compartment that is closed by means of the cover 5. In addition, exchange of battery takes place fully automatically.

A number of embodiments have been described above. The invention, however, can be varied with respect to detailed embodiments, such as the detection system, the design of the robot, etc., and thus the invention is not to be considered to be limited to the embodiments described above, but it can be varied within the scope specified by the attached patent claims.

The invention claimed is:

1. A method for exchanging batteries in battery-powered vehicles, comprising:
    providing a robot for the transport of a battery to and from a vehicle respectively, the vehicle being provided with a horizontally-placed compartment configured to hold one or more batteries lying parallel to each other, the compartment being provided with a cover configured to be opened, and providing a transportation system configured to transport the battery into and out from said compartment,
    the robot having a transport plane configured to be extended and withdrawn in one direction, the transport plane configured to be displaced along two mutually-perpendicular directions relative to the direction,
    the vehicle being at a predetermined location relative to the robot at which the transport plane is located at the cover of the vehicle;
    when the cover is opened, determining, by the robot using an optical device, the position of the battery in the compartment;
    displacing, by the robot, the transport plane to a predetermined position relative to the battery, at which position the transport plane is extended;
    attaching a withdrawal system belonging to the robot to the battery in the compartment, the withdrawal system being exchangeable, the withdrawal system including suction cups mounted onto drawbars, the suction cups being attached by suction to a surface of the battery facing the robot;
    withdrawing the battery from the compartment by the withdrawal system such that the battery rests on the transport plane;
    transporting the battery by the robot by the transport plane and subsequent transporters to a charging station;
    transporting by the robot by one or more transporters, a charged battery from a store of charged batteries in the robot to the transport plane;
    inserting, by a displacement system belonging to the robot, the battery into the compartment at a predetermined position; and
    closing the cover.

2. The method according to claim 1, further comprising identifying, by the robot, the one or more batteries before extraction of the one or more batteries by a detection device.

3. The method according to claim 2, wherein the detection device is a scanning laser.

4. The method according to claim 3, wherein an identification of the battery occurs through a reading of a barcode on the surface of the battery that faces the robot.

5. The method according to claim 2, wherein the detection device is a video camera with associated image processing software.

6. The method according to claim 5, wherein an identification of the battery occurs through a reading of a barcode on the surface of the battery that faces the robot.

7. The method according to claim 2, wherein an identification of the battery occurs through a reading of a barcode on the surface of the battery that faces the robot.

8. The method according to claim 2, wherein the optical device is a video camera with associated image processing software.

9. The method according to claim 2, wherein the optical device is a scanning laser.

10. The method according to claim 1, wherein the optical device is a scanning laser.

11. The method according to claim 10, wherein the detection device is a scanning laser.

12. The method according to claim 10, wherein the detection device is a video camera with associated image processing software.

13. The method according to claim 10, wherein an identification of the battery occurs through a reading of a barcode on the surface of the battery that faces the robot.

14. The method according to claim 1, wherein the optical device is a video camera with associated image processing software.

15. The method according to claim 14, wherein an identification of the battery occurs through a reading of a barcode on the surface of the battery that faces the robot.

16. The method according to claim 1, wherein the battery, or each one of the one or more batteries, has or have protrusions or wheels that interact with guiderails located transversely across the longitudinal direction of the vehicle in the compartment in order to position the battery in the compartment.

17. The method according to claim 16, wherein the optical device determines positions of the guiderails and positions of the protrusions or wheels.

18. The method according to claim 1, wherein the displacement system comprises drawbars that are extended such that the drawbars insert the battery into the compartment.

* * * * *